W. F. CARTWRIGHT.
RETAINING HINGE FOR BUREAU MIRRORS.
APPLICATION FILED NOV. 5, 1919. RENEWED SEPT. 8, 1920.
1,356,039. Patented Oct. 19, 1920.
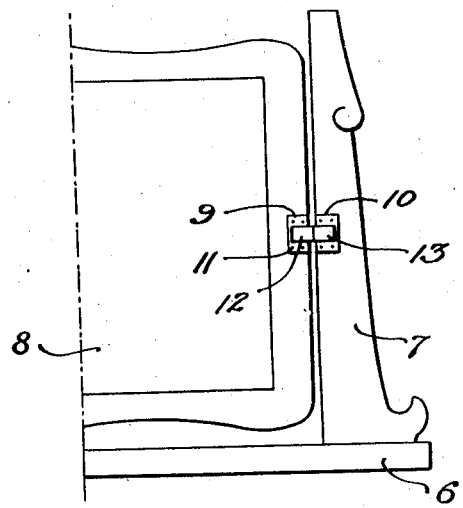
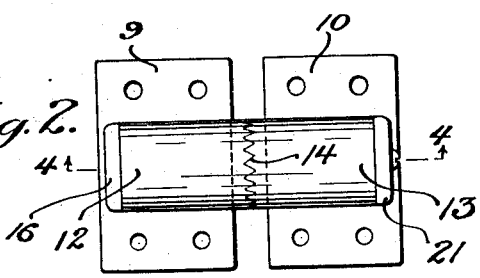
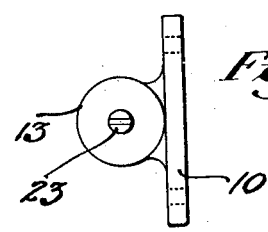
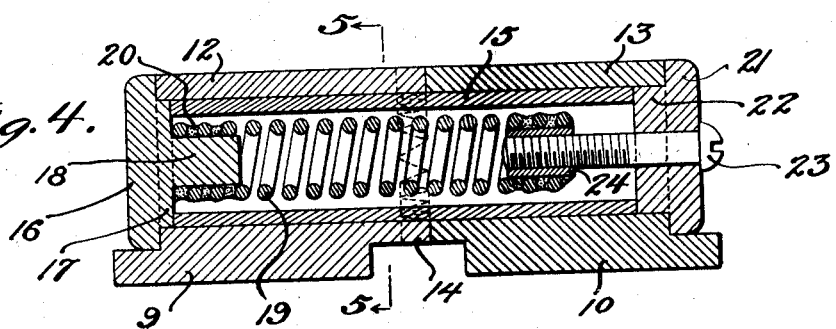
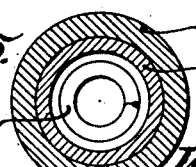
Witnesses
Geo. A. Gruss
Augustus B. Coppus
Inventor
William F. Cartwright
By Joshua R. H. Potts
his Attorney

UNITED STATES PATENT OFFICE.

WILLIAM F. CARTWRIGHT, OF PHILADELPHIA, PENNSYLVANIA.

RETAINING-HINGE FOR BUREAU-MIRRORS.

1,356,039. Specification of Letters Patent. Patented Oct. 19, 1920.

Application filed November 5, 1919, Serial No. 335,829. Renewed September 8, 1920. Serial No. 409,033.

*To all whom it may concern:*

Be it known that I, WILLIAM F. CARTWRIGHT, a citizen of the United States, residing at Philadelphia, in the county of Philadelphia and State of Pennsylvania, have invented certain new and useful Improvements in Retaining-Hinges for Bureau-Mirrors, of which the following is a specification.

One object of my invention is to provide an improved retaining hinge which will serve as a pivotal support for a member, such for example as a swinging mirror on a bureau or dresser, and which will be so constructed that it will act to retain said member in any position in which it is tilted and thereby prevent the member from returning by gravity to its normal position.

Another object is to so construct my improved retaining hinge that the parts thereof can be quickly and easily made and put together and will be durable.

These objects, and other advantageous ends which will be described hereinafter, I attain in the following manner, reference being had to the accompanying drawings in which—

Figure 1 is a rear elevation of a portion of a bureau showing my invention attached thereto for the purpose of providing a pivotal support for the mirror and operative to retain the mirror in any position into which it is swung, Fig. 2 is a face view of my improved retaining hinge, Fig. 3 is an end view of Fig. 2, Fig. 4 is an enlarged central longitudinal section of my improved retaining hinge, said section being taken on the line 4—4 of Fig. 2, and Fig. 5 is a transverse section taken on the line 5—5 of Fig. 4.

Referring to the drawings, 6 represents a bureau or dresser having a standard 7 and mirror 8. My improved retaining device includes two plates 9 and 10 respectively secured by screws 11 to the frame of the mirror 8 and standard 7. The plate 9 has a cylindrical hollow casing 12 projecting therefrom and the plate 10 has a cylindrical hollow housing 13 projecting therefrom. These housings are operatively arranged in axial alinement and have their opposing ends provided with teeth 14 which normally intermesh as clearly shown in Figs. 2 and 4. A sleeve 15, which can be made of a piece of pipe, fits within the housings 12 and 13 and forms a pivotal bearing for said housings.

An end cap plate 16 abuts the outer end of the housing 12 and has a projecting portion 17 adapted to fit within the housing 12 and to normally abut the adjacent end of the sleeve 15. A stem 18 extends from the projection 17 into the sleeve 15 and has one end of a coiled spring 19 secured thereto preferably by solder, as shown at 20. A second cap plate 21 abuts the outer end of the housing 13 and has a projection 22 which fits within the housing 13 and normally abuts the adjacent end of the sleeve 15. An adjusting screw 23 extends through the cap plate 21 and the inner end of said screw engages a tapped opening in a collar or nut 24; said collar extending within and being secured to the opposite end of the coiled spring 19.

The action of the coiled spring 19 is such as to normally pull the end cap plates 16 and 21 toward each other and thereby hold the teeth 14 of the housings 12 and 13 into mesh with each other so as to prevent the accidental swinging of the plates 9 and 10 relatively to each other and if said plates are attached, for example, to the mirror frame and standard as above stated, the mirror will be normally held against accidental movement or movement by gravity if the mirror should be tilted as is often necessary when a person is using the mirror for dressing purposes.

In order to move the plate 9 relatively to the plate 10 it is necessary to exert a manual turning action of such power as to cause the intermeshing teeth to be moved apart against the action of the coiled spring 19. However, when this turning action is stopped, the spring 19 will act to again pull the housings 12 and 13 toward each other to again cause the intermeshing of the teeth. Thus when my improved retaining hinge is employed, for example as on the mirror and bureau standard as above described, the mirror can be turned into any position desired and when manually released will remain in the position into which it was moved until the mirror is again manually moved. The arrangement of the sleeve 13 and coiled spring 19 is such as to keep the parts centralized and therefore the parts will not readily get out of order, and a durable and simple structure is provided. Also the tension of the coiled spring 19 can be readily varied merely by turning the adjusting screw 23.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A retaining hinge including two hollow housings having teeth adapted to mesh with each other; a sleeve within said housings and extending across the joint therebetween; and a spring within said sleeve adapted to keep the teeth of said housings in mesh, said housings having portions whereby they can be secured to relatively movable members; substantially as described.

2. A retaining hinge including two hollow housings having teeth adapted to mesh with each other; a sleeve within said housings and extending across the joint therebetween; end cap plates abutting the opposite ends of said housings; a spring within said sleeve and having a part attached to a portion of one of said cap plates; a nut secured to another part of said spring; and an adjusting screw extending through the other of said cap plates and fitting said nut, said housings having portions whereby they can be secured to relatively movable members; substantially as described.

In testimony whereof I have signed my name to this specification in the presence of two subscribing witnesses.

WILLIAM F. CARTWRIGHT

Witnesses:
  ANNA RENTON,
  CHAS. E. POTTS.